(12) United States Patent
Qin et al.

(10) Patent No.: US 8,917,675 B2
(45) Date of Patent: Dec. 23, 2014

(54) SYSTEM AND METHOD FOR MULTIPLE CONTENTION ACCESS PERIODS

(75) Inventors: Xiangping Qin, San Jose, CA (US); Harkirat Singh, Santa Clara, CA (US); Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 998 days.

(21) Appl. No.: 12/189,534

(22) Filed: Aug. 11, 2008

(65) Prior Publication Data

US 2009/0052389 A1 Feb. 26, 2009

Related U.S. Application Data

(60) Provisional application No. 60/965,558, filed on Aug. 20, 2007, provisional application No. 60/965,559, filed on Aug. 20, 2007.

(51) Int. Cl.
*H04W 4/00* (2009.01)
*H04W 74/08* (2009.01)

(52) U.S. Cl.
CPC .................................. *H04W 74/08* (2013.01)
USPC ....................................................... 370/329

(58) Field of Classification Search
None
See application file for complete search history.

(56) References Cited

U.S. PATENT DOCUMENTS

| | | |
|---|---|---|
| 5,596,333 A | 1/1997 | Bruckert |
| 5,924,020 A * | 7/1999 | Forssen et al. ................ 455/129 |
| 6,414,955 B1 | 7/2002 | Clare et al. |
| 6,515,976 B1 | 2/2003 | Dent et al. |
| 6,954,449 B2 | 10/2005 | Cain et al. |
| 6,985,498 B2 | 1/2006 | Laroia et al. |
| 7,027,409 B2 | 4/2006 | Cain |
| 7,043,274 B2 | 5/2006 | Cuffaro |
| 7,085,541 B2 | 8/2006 | Redi et al. |
| 7,272,126 B2 | 9/2007 | Soltanian et al. |

(Continued)

OTHER PUBLICATIONS

IEEE 802.15.3™ Standard for Information Technology—Telecommunications and information exchange between systems—Local and metropolitan area networks—Specific requirements, Part 15.3: Wireless Medium Access Control (MAC) and Physcial Layer (PHY) Specifications for High Rate Wireless Personal Area Networks (WPANs), IEEE Std 802.15.3-2003, IEEE Computer Society, Sep. 29, 2003, pp. 1-324.

(Continued)

*Primary Examiner* — Rhonda Murphy
(74) *Attorney, Agent, or Firm* — Kenneth L. Sherman, Esq.; Michael Zarrabian, Esq.; Sherman & Zarrabian LLP (57) ABSTRACT

A system and method for multiple contention access periods is disclosed. In one embodiment, the system for wireless communication comprises a coordinator configured to schedule wireless transmissions among a plurality of wireless devices during a plurality of superframes, at least one of the superframes comprising a period during which the coordinator is configured to receive one or more data packets from the wireless devices via at least one random access scheme, the period being partitioned into a plurality of sub-periods which do not overlap with one another, wherein the coordinator is configured to receive at least a first data packet having a first value for a parameter during a first sub-period and a second data packet having a second value for the parameter during a second sub-period, and wherein the first and second values for the parameter are different from each other.

39 Claims, 6 Drawing Sheets

(56) References Cited

U.S. PATENT DOCUMENTS

| | | | |
|---|---|---|---|
| 7,304,972 | B2 | 12/2007 | Cain et al. |
| 7,333,458 | B2 | 2/2008 | Cain |
| 7,420,944 | B2 | 9/2008 | Norris et al. |
| 7,453,832 | B2 | 11/2008 | Steer et al. |
| 7,471,667 | B2 * | 12/2008 | Hirsch et al. ................. 370/348 |
| 7,489,650 | B2 | 2/2009 | Ginzburg et al. |
| 7,515,577 | B2 | 4/2009 | Pandey et al. |
| 7,551,135 | B2 | 6/2009 | Uno et al. |
| 7,630,343 | B2 | 12/2009 | Zhu et al. |
| 7,664,054 | B2 | 2/2010 | Adya et al. |
| 7,684,333 | B1 * | 3/2010 | Dasylva et al. ............ 370/235.1 |
| 7,783,258 | B2 | 8/2010 | Bevan et al. |
| 7,826,431 | B2 | 11/2010 | Cave et al. |
| 8,054,223 | B2 | 11/2011 | Lakkis |
| 8,081,110 | B2 | 12/2011 | Lakkis |
| 8,095,069 | B2 | 1/2012 | Maltsev et al. |
| 2002/0044549 | A1 | 4/2002 | Johansson et al. |
| 2002/0183095 | A1 * | 12/2002 | Aoyama et al. ............... 455/561 |
| 2004/0105412 | A1 | 6/2004 | He et al. |
| 2004/0141511 | A1 | 7/2004 | Rune et al. |
| 2005/0097409 | A1 | 5/2005 | Shin et al. |
| 2006/0050728 | A1 | 3/2006 | Sung et al. |
| 2006/0067280 | A1 * | 3/2006 | Howard et al. ............... 370/337 |
| 2006/0209876 | A1 * | 9/2006 | Liu et al. ...................... 370/445 |
| 2006/0227740 | A1 | 10/2006 | McLaughlin et al. |
| 2006/0268800 | A1 | 11/2006 | Sugaya et al. |
| 2007/0115817 | A1 | 5/2007 | Gupta et al. |
| 2007/0287384 | A1 | 12/2007 | Sadri et al. |
| 2007/0297365 | A1 | 12/2007 | Li et al. |
| 2008/0026797 | A1 | 1/2008 | Nanda et al. |
| 2008/0112375 | A1 * | 5/2008 | Bennett ......................... 370/338 |
| 2008/0198815 | A1 * | 8/2008 | Liu ................................ 370/336 |
| 2009/0016285 | A1 | 1/2009 | Li et al. |
| 2009/0046653 | A1 | 2/2009 | Singh et al. |
| 2009/0109938 | A1 | 4/2009 | Singh et al. |
| 2009/0125792 | A1 | 5/2009 | Lakkis |
| 2009/0160707 | A1 | 6/2009 | Lakkis |
| 2009/0323611 | A1 | 12/2009 | Singh et al. |
| 2010/0014489 | A1 | 1/2010 | Qin et al. |
| 2010/0091919 | A1 * | 4/2010 | Xu et al. ....................... 375/346 |
| 2010/0110981 | A1 | 5/2010 | Shao et al. |
| 2010/0111006 | A1 | 5/2010 | Zhai et al. |
| 2010/0118835 | A1 | 5/2010 | Lakkis et al. |
| 2010/0142445 | A1 | 6/2010 | Schlicht et al. |
| 2010/0142460 | A1 | 6/2010 | Zhai et al. |
| 2010/0172296 | A1 | 7/2010 | Singh et al. |
| 2010/0177719 | A1 | 7/2010 | Shao et al. |
| 2011/0064072 | A1 * | 3/2011 | Wang et al. ................... 370/350 |
| 2013/0128839 | A1 | 5/2013 | Shao et al. |

OTHER PUBLICATIONS

Lakkis et al., TG3c Call for Proposals, IEEE P802.15 Working Group for Wireless Personal Area Networks (WPANs), Doc. # 15-08-0355-00-003c, May 14, 2008, Chapter 2 Superframe Structure, pp. 37-43.

International Preliminary Report on Patentability and Written Opinion dated Feb. 24, 2010 in Application No. PCT/KR2008/004793, filed Aug. 19, 2008.

International Search Report, dated Jan. 9, 2009, issued in International Application No. PCT/KR2008/004793 filed Aug. 19, 2008.

Unified and flexible millimeter wave WPAN systems supported by common mode. *IEEE* 802.15-07-0761-10-003c, Sep. 2007.

Harada, H. et al., "Unified and Flexible Millimeter Wave WPAN Systems Supported by Common Mode (IEEE 802.15-07-0761-00-003c)", Jul. 9, 2007, pp. 1-46, IEEE, United States.

Sadri, A.S. et al., "60 GHz WPAN Framework and Gaps of merged proposals (IEEE 802.15-924)", Nov. 14, 2007, pp. 1-19, IEEE, United States.

Harada, H. et al., "Merged Proposal: New PHY Layer Enhancement of MAC for mmWave System Proposal (IEEE 802.15-07-0934-01-003c)", Nov. 13, 2007, pp. 1-89, IEEE, United States.

U.S. Notice of Allowance for U.S. Appl. No. 12/188,158 mailed Mar. 2, 2012.

U.S. Non-Final Office Action for U.S. Appl. No. 12/541,096 mailed Feb. 24, 2012.

U.S. Non-Final Office Action for U.S. Appl. No. 12/628,792 mailed Feb. 24, 2012.

Harada, H. et al., "Unified and Flexible Millimeter Wave WPAN Systems Supported by Common Mode (IEEE 802.15-07-0761-00-003c)", IEEE, Jul. 9, 2007, pp. 1-46, United States.

IEEE, "IEEE Wireless LAN Edition, A Compilation Based on IEEE Std 802.11™-1999 (R2003) and Its Amendments", IEEE, 2003, pp. i-678, New York, United States.

U.S. Non-final Office Action for U.S. Appl. No. 12/188,158 mailed Oct. 27, 2011.

IEEE Computer Society, "IEEE P802.15.3c/D02 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, 2008, pp. i-192, New York, United States.

U.S. Final Office Action for U.S. Appl. No. 12/541,096 mailed Jul. 18, 2012.

U.S. Final Office Action for U.S. Appl. No. 12/628,792 mailed Jul. 30, 2012.

U.S. Non-Final Office Action for U.S. Appl. No. 12/541,096 mailed Oct. 10, 2012.

U.S. Notice of Allowance for U.S. Appl. No. 12/628,792 mailed Oct. 4, 2012.

U.S. Non-Final Office Action for U.S. Appl. No. 12/541,096 mailed Oct. 16, 2013.

U.S. Final Office Action for U.S. Appl. No. 12/541,096 mailed Feb. 6, 2013.

U.S. Notice of Allowance for U.S. Appl. No. 12/541,096 mailed Apr. 11, 2014.

U.S. Non-Final Office Action for U.S. Appl. No. 13/740,020 mailed Oct. 7, 2014.

* cited by examiner

SYSTEM AND METHOD FOR MULTIPLE CONTENTION ACCESS PERIODS

CROSS-REFERENCE TO RELATED APPLICATIONS

This application claims the benefit under 35 U.S.C. 119(e) of U.S. Provisional Application Nos. 60/965,558, filed on Aug. 20, 2007 and 60/965,559, filed on Aug. 20, 2007, the disclosures of which are incorporated herein by reference in their entirety.

BACKGROUND

1. Field

The present invention relates to wireless communications and more particularly relates to random access schemes in a wireless network.

2. Description of the Related Technology

A wireless communication network is commonly associated with a telecommunications network where the interconnections among the communication devices are implemented without the use of wires. Wireless telecommunications networks are generally implemented with some type of remote information transmission system that uses electromagnetic waves, such as radio waves, for the carrier and this implementation usually takes place at the physical layer of the network.

A wireless personal area network (WPAN) is a wireless network used for communication among a plurality of devices, such as computers, mobile phones, personal digital assistants, printers, digital cameras, televisions, media players, etc. A number of standards for network communications have recently been developed, including Bluetooth and IEEE 802.15.

SUMMARY OF CERTAIN INVENTIVE ASPECTS

One aspect of the invention is a system for wireless communication, the system comprising a coordinator configured to schedule wireless transmissions among a plurality of wireless devices during a plurality of superframes, at least one of the superframes comprising a period during which the coordinator is configured to receive one or more data packets from the wireless devices via at least one random access scheme, the period being partitioned into a plurality of sub-periods which do not overlap with one another, wherein the coordinator is configured to receive at least a first data packet having a first value for a parameter during a first sub-period and a second data packet having a second value for the parameter during a second sub-period, and wherein the first and second values for the parameter are different from each other.

Another aspect of the invention is an electronic device for wireless communication, the device comprising a transmitter configured to wirelessly transmit a data packet to a coordinator during a contention access period of at least one of a plurality of superframes, the contention access period comprising a plurality of non-overlapping sub-contention access periods, and a receiver configured to receive information on the plurality of sub-contention access periods, wherein the transmitter is further configured to send the data packet during one or more of the plurality of sub-contention access periods based at least partly on the received information.

Another aspect of the invention is a method of wireless communication in a wireless network, the method comprising receiving a first data packet having a first value for a parameter during a first sub-contention access period of a superframe, wherein the superframe comprises a contention access period, wherein the contention access period comprises the first sub-contention access period and at least a second sub-contention access period, the first and second sub-contention access periods being non-overlapping with each other, and receiving a second data packet having a second value for the parameter during the second sub-contention access period, wherein the first and second values for the parameter are different.

Yet another aspect of the invention is a method for wirelessly communicating data, the method comprising transmitting a data packet to a coordinator during a contention access period of at least one of a plurality of superframes, the contention access period comprising a plurality of non-overlapping sub-contention access periods, and receiving information on the plurality of sub-contention access periods, wherein the data packet is transmitted during one or more of the plurality of sub-contention access periods based at least partly on the information on the plurality of sub-contention access periods.

DETAILED DESCRIPTION OF CERTAIN INVENTIVE EMBODIMENTS

Certain embodiments provide a method and system for having multiple contention access periods within a superframe.

The following detailed description is directed to certain sample embodiments of the invention. However, the invention can be embodied in a multitude of different ways as defined and covered by the claims. In this description, reference is made to the drawings wherein like parts are designated with like numerals throughout.

System Overview

Figure 1:
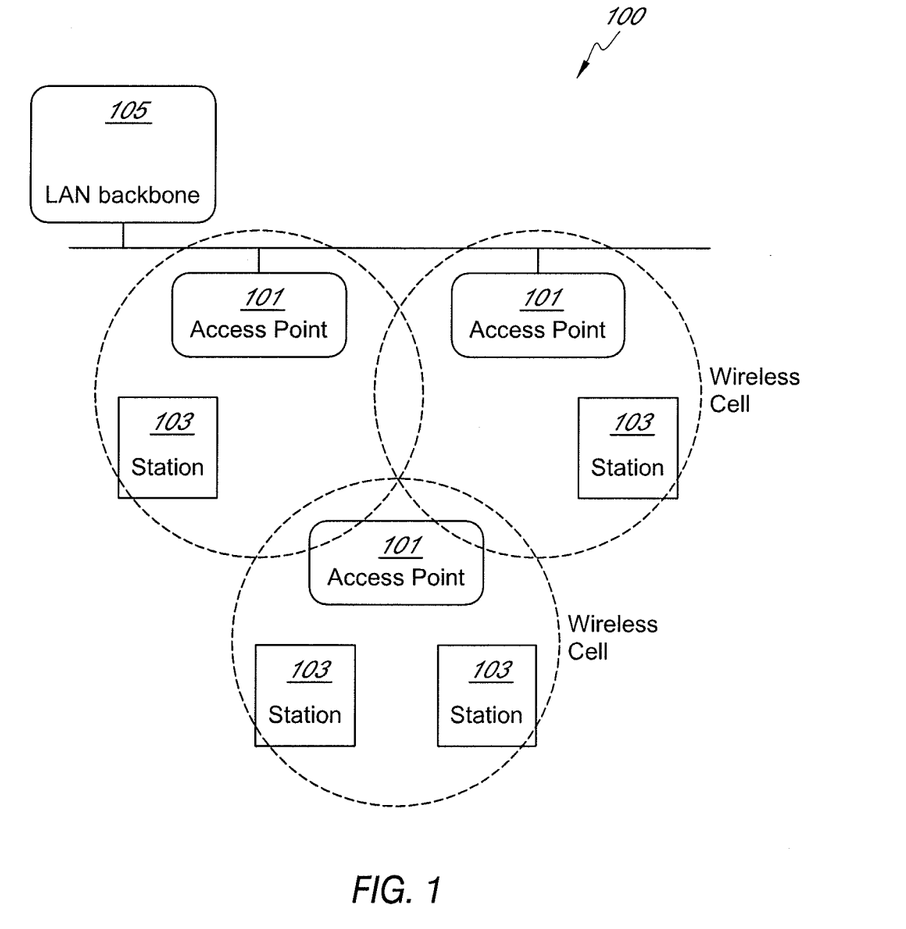
FIG. 1 is a block diagram illustrating an example wireless local area network (WLAN) configuration using an access point.

Exemplary implementations of an embodiment in a wireless network will now be described. The embodiment will be described in the context of a wireless local area network (WLAN). A skilled technologist will, however, appreciate that the embodiment can be adapted for other types of wireless networks. FIG. 1 is a block diagram illustrating an example wireless local area network (WLAN) configuration 100 using an access point 101. The example WLAN configuration 100 includes one or more access points 101 and one or more stations 103. In the example WLAN, the stations 103 include wireless clients. The access point 101 is a device that connects a wireless station 103 to the WLAN. In an access point based topology, the access points 101 are connected to a wired (e.g., Ethernet or token ring) or wireless backbone 105 and routes the traffic through the wired or wireless backbone. In a WLAN, the access point 101 enables a wireless station 103 to communicate with other wired or wireless stations on the WLAN 100. In some embodiments, the access point 101 supports the IEEE 802.11 Protocol.

The coordinator is responsible for coordinating data transfer between itself and other devices by partitioning the wireless channel time into a number of time periods and scheduling communication between specific devices during those time periods. The coordinator may be, for example, a television, a set-top box, a personal computer, a laptop computer, or a dedicated controlling box.

The wireless station 103 can be a source of compressed or uncompressed video or audio. Examples of the wireless station 103 include a desktop computer, a laptop computer, a set-top box, a DVD player or recorder, a VCR (video cassette recorder, an audio player, a digital camera, a camcorder, and so forth. In some embodiments, the content can be protected content.

Figure 2:
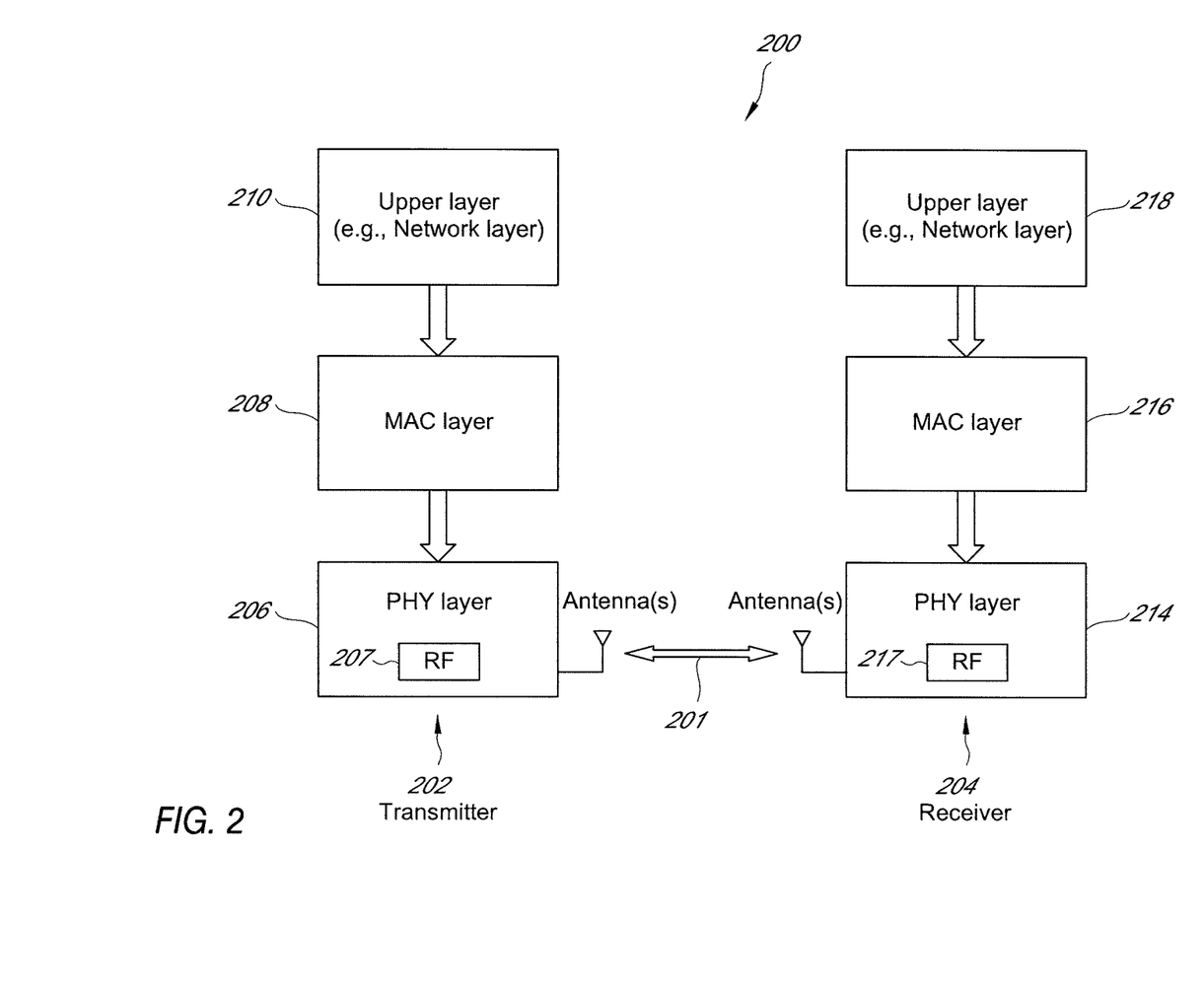
FIG. 2 is a functional block diagram of an example wireless local area network (WLAN) system, according to one embodiment of the system and method.

FIG. 2 shows a generalized block diagram illustrating an example wireless local area network (WLAN) system 200. The example WLAN system 200 includes a wireless transmitter 202 and wireless receiver 204. In certain embodiments, the WLAN system 200 shown in FIG. 2 represents an IEEE 802.11 stack. The transmitter 202 includes a physical (PHY) layer 206, a media access control (MAC) layer 208, an upper layer 210, and one or more antennas. Similarly, the receiver 204 includes a PHY layer 214, a MAC layer 216, an upper layer 218, and one or more antennas. In some embodiments, the PHY layers 206, 214 include radio frequency (RF) modules 207, 217. The PHY layers 206, 214 provide wireless communication between the transmitter 202 and the receiver 204 via the RF modules 207, 217 and the one or more antennas through a wireless medium 201. The MAC layers 208, 216 provides addressing and channel access controls that make it possible for several network nodes to communicate within a multipoint network such as the WLAN 100 shown in FIG. 1.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of routing data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer.

In the wireless transmitter 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the wireless receiver 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

Wireless Network Employing Partitioned Contention Access Periods

Wireless networks typically include multiple devices in communication with one another over wireless channels. In certain conventional wireless networks employing a random access channel, each device wishing to transmit packets of data does so at a random time. When more than one device transmits a packet simultaneously, a collision may occur, and in most cases, both packets of information may be lost. When a collision occurs, each packet that is lost is retransmitted by the transmitting device at another random time.

Certain conventional wireless networks use a time division multiple access scheme to avoid such a collision. Some wireless networks include a coordinator configured to coordinate transmissions between wireless devices. Such wireless network may employ a timeline partitioned into multiple superframes, each of which includes a beacon period and a contention access period (CAP) following the beacon period. The coordinator may send beacon signals to the wireless devices during beacon periods for providing the devices with synchronization information. The devices can send data packets to the coordinator during contention access periods.

When two or more wireless devices attempt to transmit packets to the coordinator during the same contention access period, collisions may occur if transmission of the data packets overlaps with one another. If such collisions occur, the devices need to retransmit the data packets during the same or subsequent contention access period. Such transmission collisions may degrade the overall performance of the wireless network. Therefore, there is a need for a scheme that can minimize transmission collisions during a contention access period.

In one embodiment, a wireless network includes a coordinator and a plurality of wireless devices. The wireless network may employ a timeline partitioned into superframes. Each superframe may be further partitioned to include a beacon period, a contention access period, and a contention free period. During beacon periods, the coordinator may transmit beacons to the devices to, for example, synchronize and schedule transmissions between the wireless devices. During contention access periods, the devices transmit to the coordinator using random access schemes. Each of the contention access periods may be further partitioned into a plurality of sub-contention access periods. During each sub-contention access period, the coordinator receives data packets from wireless devices having one or more parameters. The parameters can include, but are not limited to, a direction, a random access mode, and a modulation and coding scheme. At least one of the parameters can be different from sub-contention access period to sub-contention access period.

Figure 3A:
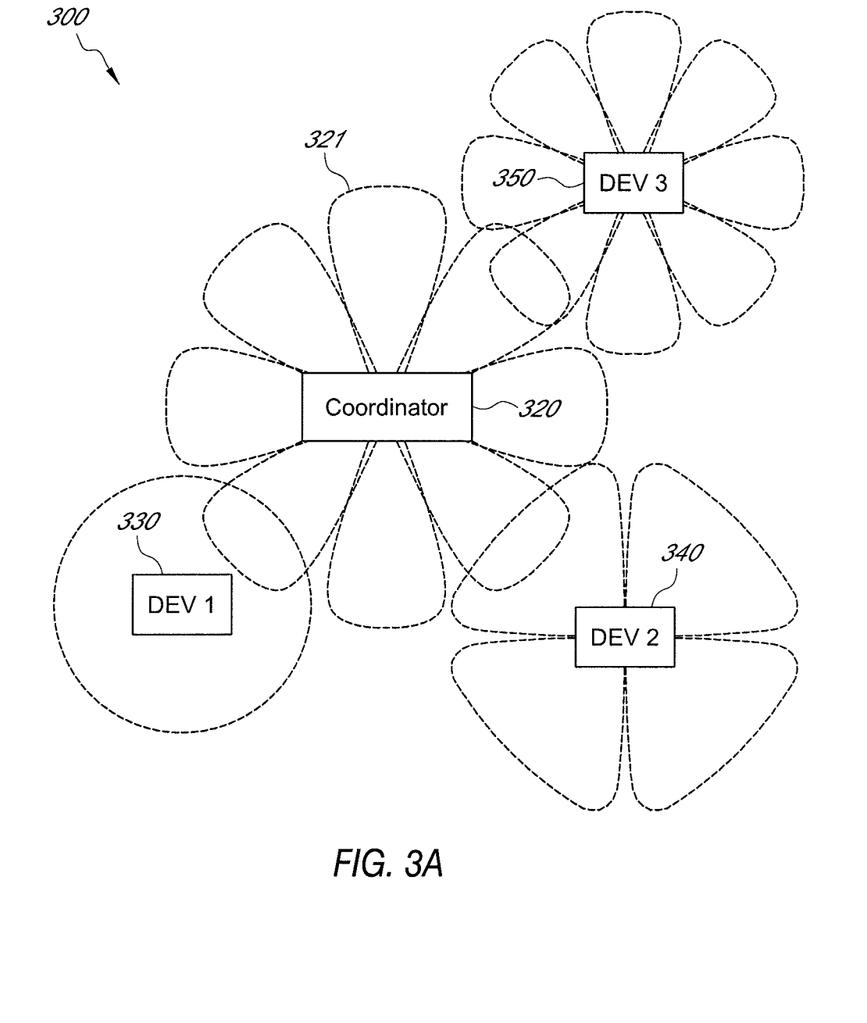
FIG. 3A is a functional block diagram of one embodiment of a wireless network, including a coordinator and wireless devices having directional and/or omni-directional antennae.

Referring to FIG. 3A, a wireless network including a coordinator and wireless devices according to one embodiment will be described below. The illustrated network 300A includes a coordinator 320 and first to third devices 330, 340, 350. The coordinator 320 and the first to third devices 330, 340, 350 may communicate using a variety of different parameters, including, but not limited to, different directions, different modulation and coding schemes, different protocols, different random access schemes, and different frequency bands.

The coordinator 320 includes a sector antenna for wireless transmission and reception. The sector antenna includes a plurality of sectors 321, each of which represents a different direction for transmission or reception of data. The coordinator 320 selects a sector and, while the sector is selected, is able to transmit or receive data in that direction. The coordinator performs a directional transmission using each of the sectors of the sector antenna. However, by using the plurality of sectors 321, the coordinator 320 may emulate an omni-directional transmission in certain instances. In other embodiments, the coordinator 320 may have an omni-directional antenna.

Each device 330, 340, 350 may have directional and/or omni-directional transmission capabilities. In one embodiment, the devices can perform directional transmission using a channel having a frequency of about 57 GHz to about 64 GHz and a range of up to 10 m.

The first device 330 may utilize omni-directional transmission and reception. The second device 340 may utilize a sectored antenna with more or less sectors than the coordinator 320. In addition, the third device 350 may utilize a sector antenna with the same number of sectors as the coordinator 320. Each of the first to third devices 330, 340, 350 can be a television, a desktop computer, a laptop computer, a set-top box, a DVD player or recorder, a VCR, an audio player, a digital camera, a camcorder, a game device, or a computer peripheral such as a mouse, a keyboard, a printer, or a scanner.

In directional transmission, beamforming may also be used by either the coordinator 320 or one or more of the devices. In some embodiments, an asymmetric antenna system (AAS) may be employed by either the coordinator or one of more of the devices, resulting in different sets of transmission and reception directions.

Figure 3B:
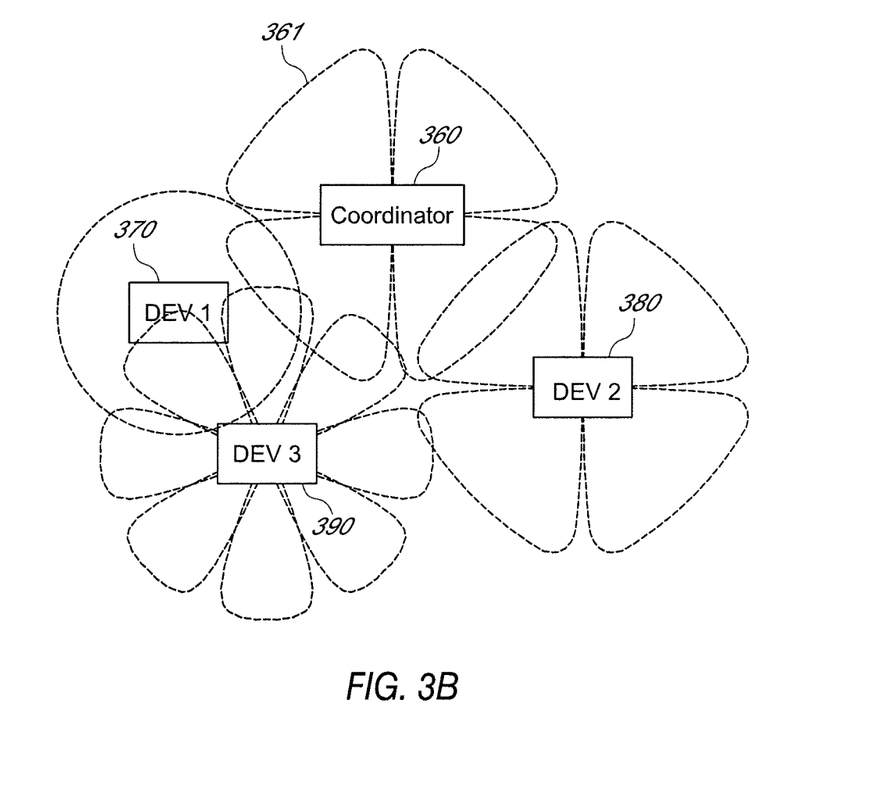
FIG. 3B is a functional block diagram of another embodiment of a wireless network, including a coordinator and wireless devices having directional and/or omni-directional antennae.

FIG. 3B is a functional block diagram of another embodiment of a wireless network including a coordinator and wireless devices. The illustrated network 300B includes a coordinator 360 and first to third devices 370, 380, 390. In this embodiment, a first device 370 utilizing an omni-directional antenna and a third device utilizing a directional antenna 390 are both located in the same direction 361 of the device coordinator 360. In this embodiment, the second device 380 utilizes a directional antenna, but is in a different direction of the device coordinator 360 than the first device 370 and third device 390.

Figure 4A:
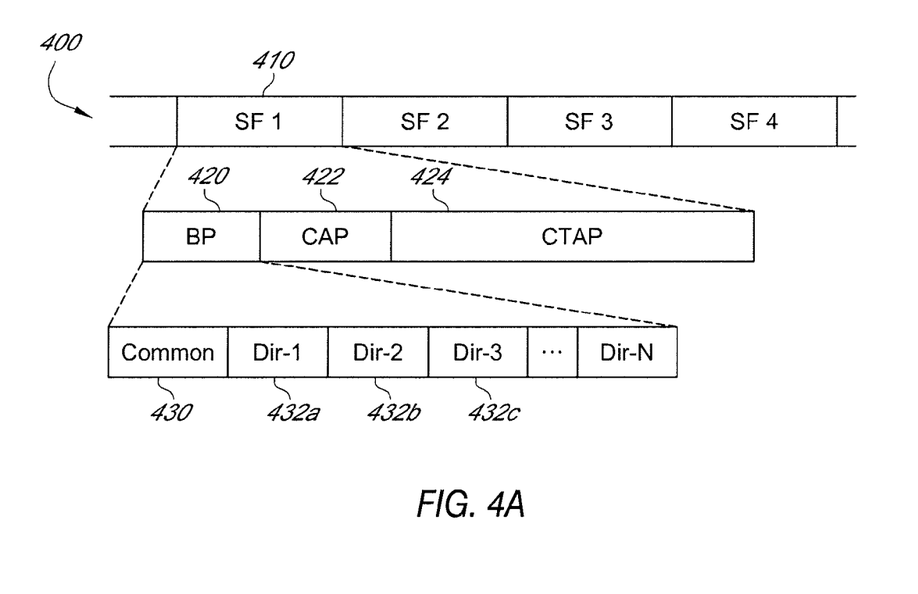
FIG. 4A is a timeline including a plurality of superframes, according to one embodiment.

The networks described above in connection with FIGS. 3A and 3B may operate by transmitting and receiving information by partitioning time into a multitude of superframe time periods. FIG. 4A is a diagram of time partitioned into a plurality of superframes 410, according to one embodiment. Each of superframes 410 may be further partitioned into a beacon period 420, a contention access period (CAP) 422, and a channel time access period (CTAP) 424. A skilled technologist will appreciate that the superframe may have any other suitable periods, depending on the design of the network.

During the beacon period 420, the coordinator, such as the coordinator 320 of FIG. 3A, transmits beacons to the wireless devices, such as the devices 330, 340, 350 of FIG. 3A. A beacon may, for example, contain information about the network, such as information about the coordinator or the superframe partitioning. A beacon may also contain reservation schedule information for devices in the network. Beacons may be transmitted omni-directionally or in one or more particular directions. Beacons may be transmitted using any of a number of modulation and coding schemes, and any number of physical layer transmission schemes, including orthogonal frequency division multiplexing (OFDM) and single-carrier transmission. Beacons may be broadcast, such that any device may receive and interpret the beacon, or they may be addressed to a particular device. Beacons transmitted within the beacon period 420 are not necessarily the same size, and thus do not necessarily take the same amount of time to transmit. The beacon period 420 may be partitioned into sub-beacon periods, where a beacon is transmitted by the coordinator during each sub-beacon period.

In the embodiment of FIG. 4A, the beacons may include a common mode period 430 and a plurality of directional transmission periods 432a-432c. The coordinator can broadcast an omni-directional beacon, for example, during the common mode period 430. This beacon may contain information about the network or the superframe partitioning.

The coordinator may also transmit a directional beacon in a first direction during a first directional transmission period 432a. The directional beacon may contain information about the superframe partitioning, such as when a device in that direction should randomly access the channel during the contention access period 422, as will be discussed further below. Directional beacons may be transmitted in a number of directions during the plurality of directional transmission periods 432a-432c of a single superframe. In other embodiments, only one directional beacon is transmitted in a single direction during a superframe, thus requiring a number of superframes to pass before a directional beacon has been transmitted in each direction.

The directional beacon may contain reservation schedule information for that device. Reservation schedule information may include information about when the coordinator and the device may exchange data during the channel time access period (CTAP) 424. A skilled technologist will appreciate that the beacons described above may be modified or omitted, and other types of beacons may be added, depending on the wireless network.

During the contention access period (CAP) 422, the wireless devices announce themselves to the coordinator by transmitting an association request to the coordinator. In response to the association request, the coordinator may reserve time during the CTAP 424 of subsequent superframes for communication with the device, and may transmit information indicative of the reservation to the device during the beacon period 420.

The wireless channel may be a random access channel during the contention access period 422. Any of a number of random access schemes may be used in the network, including, but not limited to, slotted Aloha, carrier sense multiple access (CSMA), carrier sense multiple access with collision avoidance (CSMA/CA), or preamble sense multiple access (PSMA). As is the case in many random access schemes, collisions may occur when a number of devices transmit data packets simultaneously.

Figure 4B:
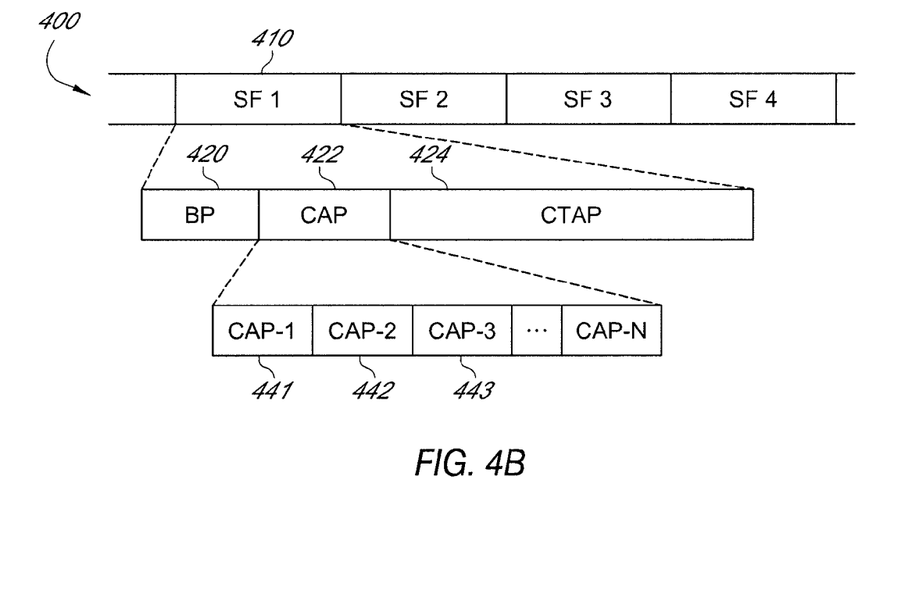
FIG. 4B is a timeline including a plurality of superframes, according to another embodiment.

In the illustrated embodiment, at least one of the contention access period 422 may be further partitioned into a number of sub-CAPs, as shown in FIG. 4B. During each sub-CAP, the coordinator is configured to receive packets from devices using different parameters. In one embodiment, the CAP 422 may be partitioned into a number of sub-CAPs 441, 442, 443, where the sub-CAPs are assigned to transmissions in different directions from one another. In the context of this document, a transmission in a direction generally encompasses one or more transmissions from transmitting positions within a selected range. A skilled technologist will, however, appreciate that the selected range of angle can vary widely depending on the channel used for the transmission.

The coordinator listens for data packets coming from a different direction during each sub-CAP. For example, the coordinator 320 of FIG. 3A may partition the CAP 422 into eight sub-CAPs, each sub-CAP corresponding to a different sector of the sector antenna. Then, during each corresponding sub-CAP, the coordinator 320 sets the antenna to that sector and listens for data packets. This reduces the possibility of a collision during the CAP 422 as each device is located in a different direction of the coordinator in the exemplary network of FIG. 3A. When the coordinator bases the partitioning of the CAP 422 on direction, the modulation and coding scheme may be a mode common to all devices.

If the first device 370 and third device 390 utilize different modulation and coding schemes, different random access schemes, or different physical layer transmission schemes, collision between data packets sent by the two devices could be avoided by partitioning the CAP 422 into at least two sub-CAPs according to these parameters. For example, the CAP 422 may be partitioned into two sub-CAPs, where the coordinator is configured to receive data packets using a single carrier mode during the first sub-CAP and is configured to receive data packets using OFDM during the second sub-CAP.

In another embodiment, the CAP 422 is partitioned into two sub-CAPs, where the coordinator is configured to receive data packets from devices using a slotted Aloha random access scheme during the first sub-CAP and is configured to receive data packets from devices using a CSMA/CA random access scheme during the second sub-CAP. In one embodiment, because CSMA/CA is a more efficient random access scheme, the sub-CAP corresponding to CSMA/CA may be shorter than the sub-CAP corresponding to slotted Aloha.

The partitioning methods may, in some embodiments, be combined such that the CAP 422 is divided into sets of sub-CAPs, each set corresponding to a different parameter (such as MCS or random access scheme), and each sub-CAP within each set associated with a different direction. In this way, the probability of collision can be further reduced.

Partitioning of the CAP 422 may also be performed by device ID or serial number of the device. Different sub-CAPs may be used for devices having different functions, such as audio, video, and data functionality. Different sub-CAPs may be assigned for simple devices and advanced devices. As with the sub-beacon periods, the sub-contention access periods may be of unequal size.

Although, association messages are typically transmitted during the CAP 422 of a superframe 410, other MAC commands may be included in a packet and transmitted during this time. For example, devices may transmit data to one another bypassing the coordinator during the CAP 422. Also, other data packets besides association messages may be transmitted from the devices to the coordinator during the CAP 422.

As mentioned above, the beacon period 420 may be partitioned into a number of sub-beacon periods during which a single beacon is sent. Some beacons may transmit information about the partitioning of the CAP 422 into sub-CAPs. For example, in one embodiment, a beacon is sent in each direction specifying the direction, start time, and either the duration or end time of the sub-CAP corresponding to that direction. In another embodiment, a single beacon is broadcast omni-directionally with information about the CAP partitioning. In other cases, default rules about the CAP partitioning may be in place that makes transmitting a beacon with CAP partitioning information unnecessary.

In some wireless networks, a particular CAP partitioning may be unsuitable for the particular configuration of devices. For example, if a group of devices are all located within a single direction of a device coordinator, partitioning the CAP into a number of sub-CAPs, each corresponding to a different direction reduces the amount of time each device can use to transmit data packets. In this, and other cases, dynamic CAP partitioning may be beneficial.

Figure 5:
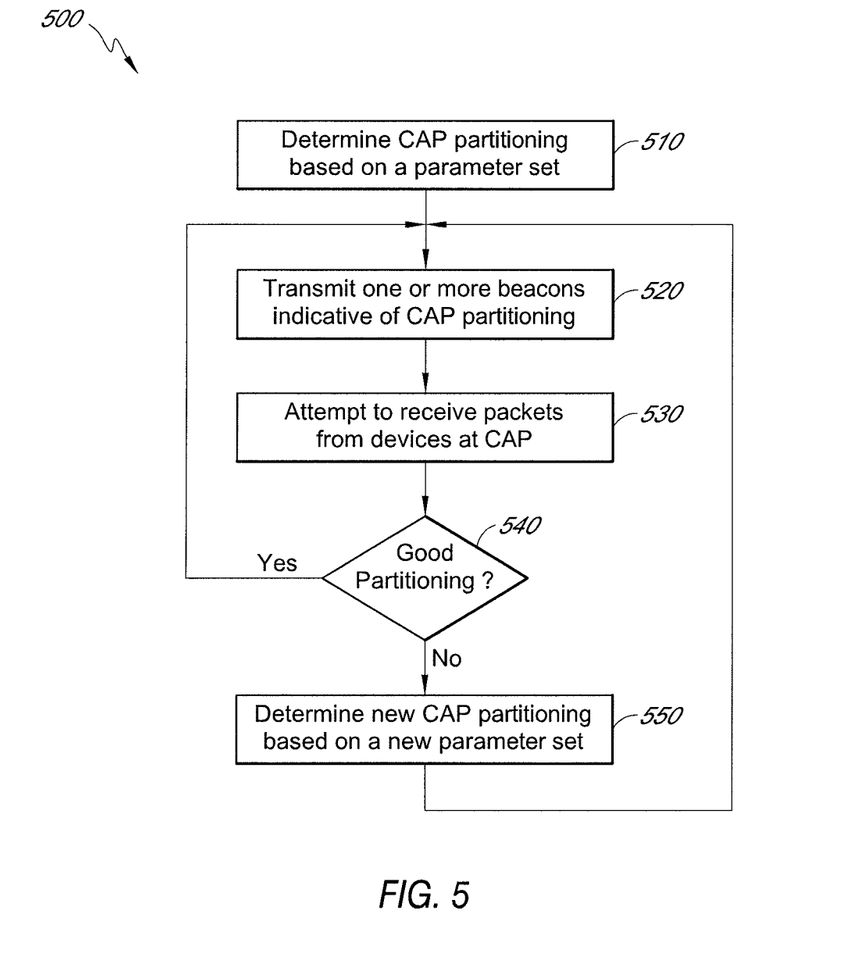
FIG. 5 is a flowchart illustrating a method of dynamically changing parameters for sub-contention access periods according to one embodiment.

FIG. 5 is a flowchart illustrating a method of dynamically partitioning a contention access period according to one embodiment. The process 500 begins, in block 510, by determining a CAP partitioning based on a first parameter set. For example, the CAP may be partitioned into a number of sub-CAPs, each sub-CAP corresponding to a different direction, or the CAP may be partitioned into a first sub-CAP corresponding to a first physical layer transmission scheme, such as single carrier transmission, and a second sub-CAP corresponding to a second physical layer transmission scheme, such as OFDM. Alternatively, the CAP partitioning at this block may be to not partition the CAP into sub-CAPs. The CAP partitioning of block 510 may be determined in part by, for example, industry standards or previously acquired information on the network topology.

In block 520, one or more beacons are transmitted indicating the determined CAP partitioning. In the case that the CAP is partitioned into a number of sub-CAPs, each sub-CAP corresponding to a different direction, a beacon may be sent omni-directionally, or multiple beacons may be transmitted, one in each direction. In the case the CAP is partitioned based on modulation and coding scheme, a beacon may be sent in a common mode, or multiple beacons may be transmitted, based on multiple modulation and coding schemes. In the case that the CAP partitioning is determined by default rules (for example, the default rules of an industrial standard), the transmission of a beacon indicating the CAP partitioning determined in block 510 may be unnecessary.

In block 530, the coordinator receives data packets transmission in CAP. In the case that the CAP is partitioned according to direction, this may involve setting a sector antenna to each direction at the beginning of the sub-CAP corresponding to that direction. In the case that the CAP is partitioned according to modulation and coding scheme, this may involve post-processing any received messages according to the modulation and coding scheme.

In block 540, it is determined if the CAP partitioning is good in the sense of reducing the probability of collision and allows for data packets to be, for the most part, correctly received. It may be determined that the current CAP partitioning is not a good partitioning if the number of collisions is high.

If the CAP partitioning is determined to be a good partitioning, the process 500 returns to block 520, where beacons are transmitted indicating the CAP partitioning before the CAP. In other embodiments, the process 500 returns to block 530. For example, in some embodiments beacons indicative of the partitioning are not transmitted unless the CAP partitioning is changed. If the CAP partitioning is determined not to be a good partitioning, the process 500 proceeds to block 550.

In block 550, a new CAP partitioning is determined based on a new parameter set. The parameter set may or may not include the original parameter set. For example, if the original parameter set was the coordinator directions, the new parameter set may include the coordinator directions and a number of modulation and coding schemes. Alternatively, the new parameter set may only include the number of modulation and coding schemes. After a new CAP partitioning is determined, the process 500 returns to block 520 where beacons are transmitted indicating the new CAP partitioning.

A number of advantages arise from the partitioning of the contention access period into a number of sub-contention access periods. Much overhead is required of the device coordinator to be able to receive data packets from all directions throughout the entire contention access period. By partitioning the CAP into sub-CAPs, where each sub-CAP corresponds to a different direction of the device coordinator, the same functionality is achieved with less hardware. Similarly, computer processing overhead is required to be able to receive data packets in a plurality of modulation and coding schemes during the entire CAP. By partitioning the CAP into sub-CAPS, where each sub-CAP corresponds to a different modulation and coding scheme, processing is reduced and power is saved.

In some embodiments, partitioning the CAP into sub-CAPs may reduce the probability of collision during the use of random access schemes. This increases the throughput of the channel and allows more data to be communicated in less time.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A system for wireless communication, the system comprising:
a coordinator that schedules wireless transmissions among a plurality of wireless devices during a plurality of superframes, at least one of the superframes comprising a period during which the coordinator receives one or more data packets from the wireless devices via at least one random access scheme, the period being partitioned into a plurality of sub-periods which do not overlap with one another and are assigned to wireless transmissions in different directions from one another,
wherein the coordinator receives at least a first data packet having a first value for a parameter during a first sub-period and a second data packet having a second value for the parameter during a second sub-period,
wherein the first and second values for the parameter are different from each other, and
wherein the plurality of sub-periods are dynamically partitioned based on different parameters that are selected by the coordinator, and each sub-period is associated with a different transmission direction for one or more transmissions from selected transmitting positions.

2. The system of claim 1, wherein the period is a contention access period (CAP), and wherein the plurality of sub-periods comprises first and second sub-contention access periods.

3. The system of claim 2, wherein the parameter is indicative of a direction in which the coordinator receives the data packets.

4. The system of claim 3, wherein the coordinator includes a sector antenna or antenna array.

5. The system of claim 2, wherein the parameter is indicative of a modulation and coding scheme (MCS).

6. The system of claim 2, wherein the first and second values of the parameter are respectively indicative of a first and second physical layer transmission scheme, wherein the first physical layer transmission scheme is different from the second physical layer transmission scheme.

7. The system of claim 6, wherein the first physical layer transmission scheme comprises an orthogonal frequency division multiplexing (OFDM) mode, and wherein the second physical layer transmission scheme comprises a single-carrier mode.

8. The system of claim 2, wherein the parameter is indicative of a random access scheme.

9. The system of claim 8, wherein the random access scheme comprises one or more of the following: slotted Aloha, carrier sense multiple access with collision avoidance (CSMA/CA), and preamble sense multiple access (PSMA).

10. The system of claim 2, wherein the contention access period is partitioned into a plurality of sub-contention access periods using a first partitioning, and wherein the superframe further comprises a beacon period during which the coordinator transmits one or more beacon frames to the wireless devices, and wherein the one or more beacon frames comprise information indicative of the first partitioning.

11. The system of claim 10, wherein the coordinator determines the probability of collision during at least one of the sub-periods of the first partitioning based on a first parameter set.

12. The system of claim 11, wherein the coordinator transmits information indicative of a second partitioning based on a second parameter set so that the probability of collision is reduced.

13. The method of claim 12, wherein the first parameter set and the second parameter set are different from one another.

14. The system of claim 2, wherein each of the plurality of sub-contention access periods are partitioned according to different parameters for reducing probability of collision.

15. The system of claim 14, wherein the parameters comprising one or more of different modulation and coding schemes, different random access schemes or different physical layer transmission schemes.

16. The system of claim 15, wherein the coordinator partitions the sub-contention access periods such that each sub-contention access period corresponds to a different sector of an antenna of the coordinator.

17. The system of claim 2, wherein each sub-contention access period corresponds to a different sector of an antenna.

18. The method of claim 2, wherein a first CAP partitioning is determined based on original parameter set, and a second CAP partitioning is determined based on a new parameter set.

19. The method of claim 18, wherein each parameter set including one or more parameters comprising coordinator transmission direction, modulation and coding scheme, and random access mode.

20. The method of claim 19, wherein the new parameter set includes one or more parameters of an original parameter set.

21. The method of claim 19, wherein the new parameter set includes different parameters from an original parameter set.

22. The system of claim 1, wherein each of the plurality of sub-periods correspond to a different transmission direction of the coordinator.

23. The system of claim 1, wherein each of the plurality of sub-periods correspond to different modulation and coding schemes.

24. The system of claim 1, wherein the plurality of sub-periods are partitioned into sets of sub-periods, each set of sub-periods corresponding to a different parameter, wherein each sub-period in a particular set of sub-periods is associated with a different wireless transmission direction.

25. The system of claim 1, wherein the plurality of sub-periods are partitioned based on associated device identifications.

26. The method of claim 1, wherein the parameters are dynamically selected by the coordinator for reducing probability of collision of data packets.

27. The method of claim 1, wherein the selected transmitting positions comprise transmitting position within a selected range of angle.

28. An electronic device for wireless communication, the device comprising:
- a transmitter wirelessly transmits a data packet to a coordinator during a contention access period of at least one of a plurality of superframes, the contention access period comprising a plurality of non-overlapping sub-contention access periods, wherein the sub-contention access periods are each assigned to wireless transmissions in different directions from one another for one or more transmissions from selected transmitting positions, wherein the plurality of sub-contention access periods are dynamically partitioned based on different parameters, and each sub-contention access period corresponds to a different sector of an antenna; and
- a receiver receives information on the plurality of sub-contention access periods,
- wherein the transmitter sends the data packet during one or more of the plurality of sub-contention access periods based at least partly on the received information.

29. The device of claim 28, wherein the receiver includes a memory to store and access the received information.

30. The device of claim 28, wherein the receiver receives a beacon from the coordinator, and wherein the received beacon comprises the received information.

31. A method of wireless communication in a wireless network, the method comprising:
- receiving a first data packet having a first value for a parameter during a first sub-contention access period of a superframe, wherein the superframe comprises a contention access period, wherein the contention access period comprises the first sub-contention access period and at least a second sub-contention access period, the first and second sub-contention access periods being non-overlapping with each other and are assigned to wireless transmissions in different directions from one another; and
- receiving a second data packet having a second value for the parameter during the second sub-contention access period,
- wherein the first and second values for the parameter are different,
- wherein the first and second of sub-contention access periods are dynamically partitioned based on different parameters, and each sub-contention access period is associated with a different transmission direction for one or more transmissions from selected transmitting positions.

32. The method of claim 31, further comprising transmitting information on the first and second sub-contention access periods.

33. The method of claim 31, wherein the parameter is indicative of a direction in which the data packets are received, wherein the first data packet is received from a first direction, and wherein the second data packet is received from a second direction different from the first direction.

34. The method of claim 33, further comprising:
- prior to receiving the first data packet, a directional antenna receives information from the first direction; and
- after receiving the first data packet, but prior to receiving the second data packet, the directional antenna receives information from the second direction.

35. The method of claim 31, wherein the parameter is indicative of a modulation and coding scheme, wherein the first data packet is received encoded with a first modulation and coding scheme, and wherein the second data packet is received encoded with a second modulation and coding scheme.

36. The method of claim 35, further comprising: decoding the first data packet according to the first modulation and coding scheme, and decoding the second data packet according to the second modulation and coding scheme.

37. A method for wirelessly communicating data, the method comprising:
- transmitting a data packet to a coordinator during a contention access period of at least one of a plurality of superframes, the contention access period comprising a plurality of non-overlapping sub-contention access periods, the sub-contention access periods are each assigned to wireless transmissions in different directions from one another for one or more transmissions from selected transmitting positions; and
- receiving information on the plurality of sub-contention access periods,
- wherein the data packet is transmitted during one or more of the plurality of sub-contention access periods based at least partly on the information on the plurality of sub-contention access periods,
- wherein the plurality of sub-contention access periods are dynamically partitioned based on different parameters, and each sub-contention access period corresponds to a different sector of an antenna.

38. The method of claim 37, wherein receiving information on the plurality of sub-contention access periods comprises accessing a memory.

39. The method of claim 37, wherein receiving information on the plurality of sub-contention access periods comprises receiving a beacon from the coordinator.

* * * * *